(12) United States Patent
Lee

(10) Patent No.: US 12,381,435 B2
(45) Date of Patent: Aug. 5, 2025

(54) MOTOR

(71) Applicant: LG INNOTEK CO., LTD., Seoul (KR)

(72) Inventor: Min Ho Lee, Seoul (KR)

(73) Assignee: LG INNOTEK CO., LTD., Seoul (KR)

( * ) Notice: Subject to any disclaimer, the term of this patent is extended or adjusted under 35 U.S.C. 154(b) by 222 days.

(21) Appl. No.: 18/259,659

(22) PCT Filed: Dec. 30, 2021

(86) PCT No.: PCT/KR2021/020274
§ 371 (c)(1),
(2) Date: Jun. 28, 2023

(87) PCT Pub. No.: WO2022/146074
PCT Pub. Date: Jul. 7, 2022

(65) Prior Publication Data
US 2024/0072595 A1  Feb. 29, 2024

(30) Foreign Application Priority Data

Dec. 31, 2020  (KR) .......................... 10-2020-0188744

(51) Int. Cl.
*H02K 3/50* (2006.01)
*H02K 3/34* (2006.01)

(52) U.S. Cl.
CPC .............. *H02K 3/50* (2013.01); *H02K 3/345* (2013.01); *H02K 2203/09* (2013.01)

(58) Field of Classification Search
CPC ............ H02K 5/225; H02K 3/50; H02K 3/52; H02K 3/345; H02K 3/522; H02K 2203/09; H02K 3/505; H02K 3/28

USPC .......................................................... 310/71
See application file for complete search history.

(56) References Cited

U.S. PATENT DOCUMENTS

2022/0286009 A1* 9/2022 Jeong ..................... H02K 3/522

FOREIGN PATENT DOCUMENTS

| CN | 103119834 A | 5/2013 |
|---|---|---|
| EP | 0 539 094 A2 | 4/1993 |
| JP | 2019-22311 A | 2/2019 |
| KR | 10-2016-0123143 A | 10/2016 |
| KR | 10-1892895 B1 | 10/2018 |

OTHER PUBLICATIONS

International Search Report dated Apr. 8, 2022 in International Application No. PCT/KR2021/020274.

* cited by examiner

*Primary Examiner* — Alexander A Singh
(74) *Attorney, Agent, or Firm* — Saliwanchik, Lloyd & Eisenschenk

(57) ABSTRACT

The present invention provides a motor including a shaft, a rotor coupled to the shaft, and a stator disposed to correspond to the rotor, wherein the stator includes a stator core, an insulator coupled to the stator core, and a coil disposed on the insulator, the motor includes a busbar electrically connected to the coil and a busbar holder which supports the busbar, the busbar includes a first terminal and a second terminal connected to the first terminal, the first terminal includes a first embossing and a second embossing, and the second terminal includes a first part in contact with the first embossing and a second part in contact with the second embossing.

10 Claims, 8 Drawing Sheets

MOTOR

CROSS-REFERENCE TO RELATED APPLICATIONS

This application is the U.S. national stage application of International Patent Application No. PCT/KR2021/020274, filed Dec. 30, 2021, which claims the benefit under 35 U.S.C. § 119 of Korean Application No. 10-2020-0188744, filed Dec. 31, 2020, the disclosures of each of which are incorporated herein by reference in their entirely.

TECHNICAL FIELD

The present invention relates to a motor.

BACKGROUND ART

A motor includes a rotor and a stator. In this case, the rotor rotates due to an electrical interaction between the rotor and the stator. In addition, the motor includes a busbar electrically connected to a coil wound around the stator.

In general, terminals of the busbar are connected through a fusing process. Accordingly, since a machine for the fusing process is required, there is a problem of increasing manufacturing costs.

DISCLOSURE

Technical Problem

Accordingly, the present invention is directed to providing a motor in which terminals of a busbar is connected without performing a fusing process.

Technical Solution

One aspect of the present invention provides a motor including a shaft, a rotor coupled to the shaft, and a stator disposed to correspond to the rotor, wherein the stator includes a stator core, an insulator coupled to the stator core, and a coil disposed on the insulator, the motor includes a busbar electrically connected to the coil and a busbar holder which supports the busbar, the busbar includes a first terminal and a second terminal connected to the first terminal, the first terminal includes a first embossing and a second embossing, and the second terminal includes a first part in contact with the first embossing and a second part in contact with the second embossing.

Advantageous Effects

According to the embodiment, an embossing formed on a busbar terminal can be used to connect terminals without performing a fusing process. Accordingly, effects of simplifying a manufacturing process and reducing a cost for the fusing process can be obtained.

MODES OF THE INVENTION

Hereafter, an exemplary embodiment of the present invention will be described in detail with reference to the accompanying drawings.

A direction parallel to a longitudinal direction (vertical direction) of a shaft is referred to as an axial direction, a direction perpendicular to the axial direction of the shaft is referred to as a radial direction, and a direction along a circle having a radius in the radial direction based on the shaft is referred to as a circumferential direction.

Figure 1:
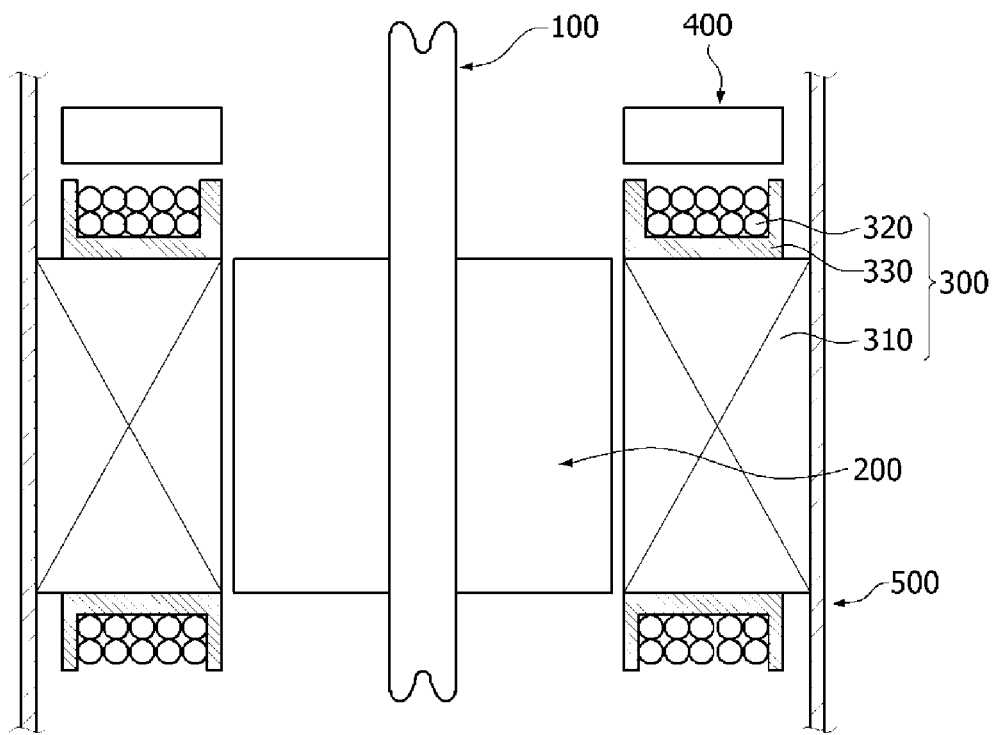
FIG. 1 is a cross-sectional view illustrating a motor according to one embodiment of the present invention.

FIG. 1 is a cross-sectional view illustrating a motor according to one embodiment of the present invention.

Referring to FIG. 1, the motor may include a shaft 100, a rotor 200, a stator 300, a busbar 400, and a housing 500.

Hereafter, the term "inward" is a direction from the housing 500 toward the shaft 100 which is a center of the motor, and the term "outward" is a direction opposite to "inward," that is, a direction from the shaft 100 toward the housing 500.

The shaft 100 may be coupled to the rotor 200. When a current is supplied, an electromagnetic interaction occurs between the rotor 200 and the stator 300, the rotor 200 rotates, and the shaft 100 rotates in conjunction with the rotor 200. The shaft 100 may be connected to a steering system of a vehicle and transmit power to the steering system.

The rotor 200 rotates due to an electrical interaction between the rotor 200 and the stator 300. The rotor 200 may be disposed inside the stator 300. The rotor 200 may include a rotor core and a rotor magnet disposed on the rotor core.

The stator 300 is disposed outside the rotor 200. The stator 300 may include a stator core 310, coils 320, and an insulator 330 mounted on the stator core 310. The coils 320 may be wound around the insulator 330. The insulator 330 is disposed between the coils 320 and the stator core 310. The coils induce an electrical interaction with the rotor magnet.

The busbar 400 is disposed on the stator 300. The busbar 400 connects the coils 320 wound around the stator 300.

The housing 500 may be disposed outside the stator 300. The housing 500 may be a cylindrical member of which one side is open. A shape or a material of the housing 500 may vary in many shapes, and a metal material which can withstand high temperatures may be selected.

Figure 2:
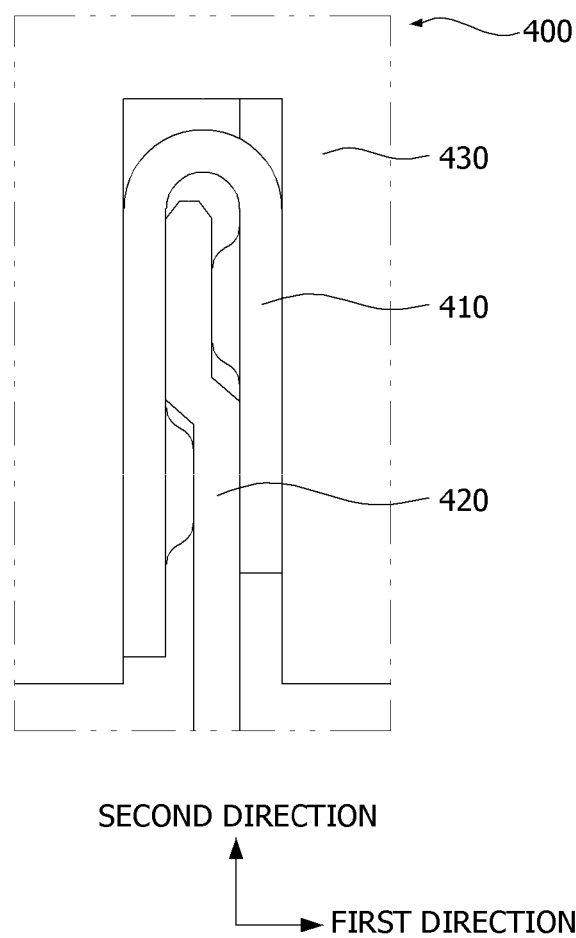
FIG. 2 is a view illustrating a part of a busbar included in the motor according to the embodiment of the present invention.

FIG. 2 is a view illustrating a part of the busbar included in the motor according to the embodiment of the present invention.

Referring to FIG. 2, the busbar 400 may include a first terminal 410, a second terminal 420, and a busbar holder 430.

The first terminal 410 may be connected to a power source. The first terminal 410 may be connected to each of phases U, V, and W of a three-phase power source. One end portion of the first terminal 410 may be exposed from the busbar holder 430. In addition, the other portion of the first terminal 410 may be bent in a "U" shape with a gap formed therein. The gap may have a predetermined width in a first direction.

The second terminal 420 may be connected to the coil 320 (illustrated in FIG. 1). In addition, the second terminal 420 may be in contact with the first terminal 410. In this case, one end portion of the second terminal 420 may be inserted into the gap formed in the first terminal 410.

The busbar holder 430 may be an annular member. The busbar holder 430 may be a molded member formed through an injection molding process. A plurality of first terminals 410 and a plurality of second terminals 420 may be disposed on the busbar holder 430.

Figure 3:
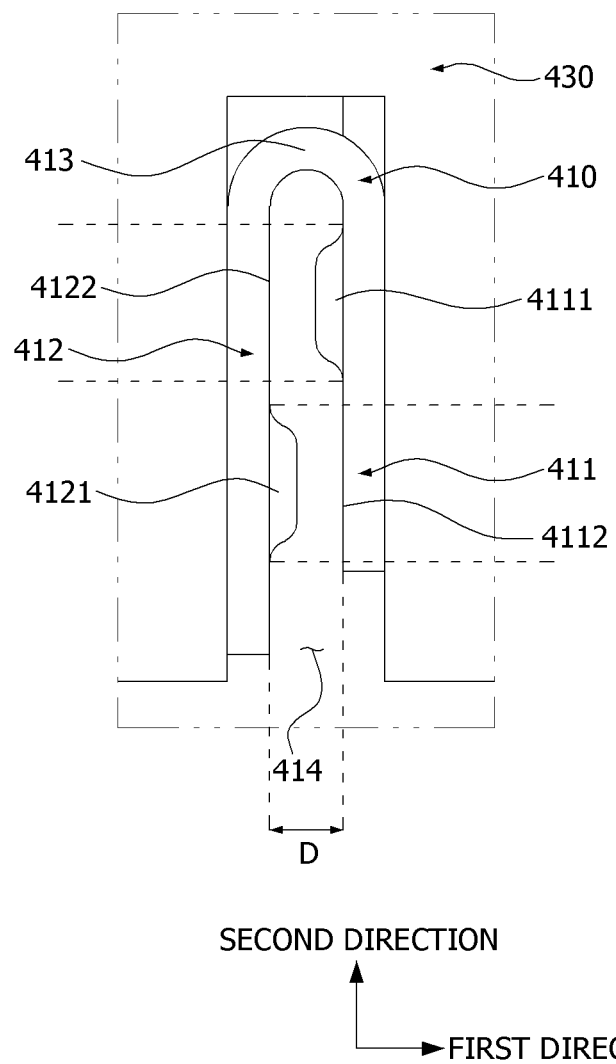
FIG. 3 is a view illustrating a busbar holder and a part of a first terminal included in the motor according to one embodiment of the present invention.
Figure 4:
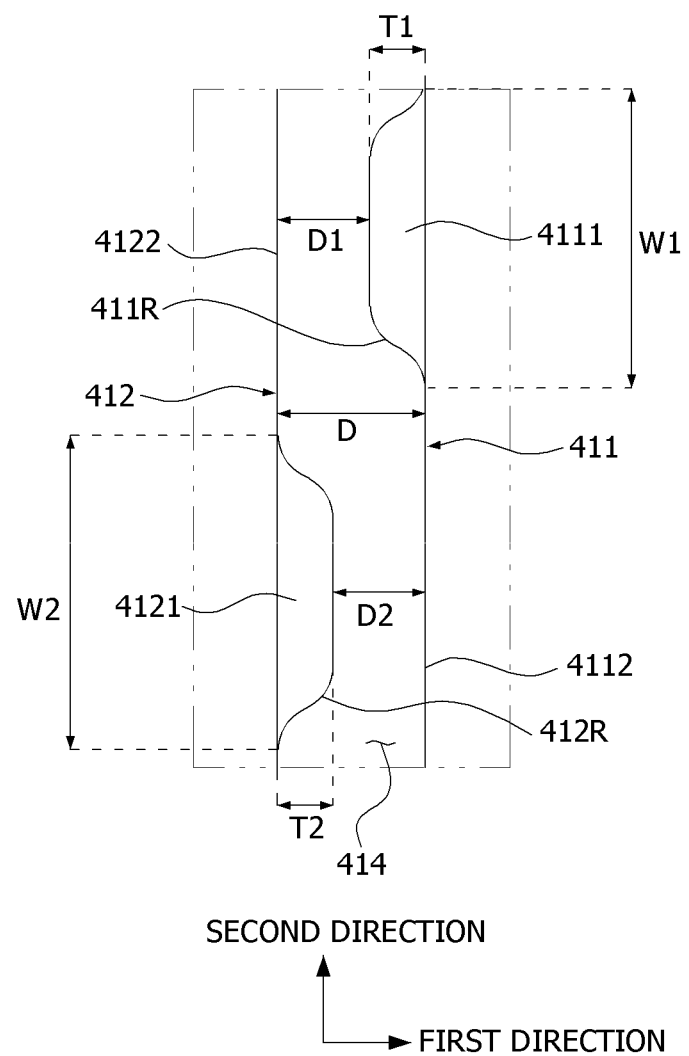
FIG. 4 is a view illustrating a part of the first terminal according to one embodiment of the present disclosure.

FIG. 3 is a view illustrating the busbar holder and a part of the first terminal included in the motor according to one embodiment of the present invention, and FIG. 4 is a view illustrating a part of the first terminal according to one embodiment of the present disclosure.

Referring to FIGS. 3 and 4, the first terminal 410 may be disposed on the busbar holder 430.

The first terminal 410 may include a first portion 411, a second portion 412, and a third portion 413. The first portion 411 may be disposed at one side of the busbar holder 430. The first portion 411 may include at least one first embossing 4111. Although the one first embossing 4111 is illustrated in the drawings, there may be a plurality of first embossings 4111. The first embossing 4111 may have a shape protruding toward the second portion 412. The first portion 411 may include a first surface 4112. The first surface 4112 may be disposed to face the second portion 412.

The second portion 412 may be disposed to be spaced apart from the first portion 411 in the first direction. The second portion 412 may include at least one second embossing 4121. Although the one second embossing 4121 is illustrated in the drawings, there may be a plurality of second embossings 4121. The second embossing 4121 may have a shape protruding toward the first portion 411. The second embossing 4121 may overlap the first surface 4112 in the first direction. The second portion 412 may include a second surface 4122. The second surface 4122 may be disposed toward the first portion 411. At least a part of the second surface 4122 may overlap the first embossing 4111 in the first direction, and another part of the second surface 4122 may overlap the first surface 4112 in the first direction.

The third portion 413 may connect the first portion 411 and the second portion 412. The third portion 413 may have a bent shape. A single member may be bent in a "U" shape to have the first portion 411, the second portion 412, and the third portion 413.

The first terminal 410 may include an opening 414. The opening 414 may be disposed between an end portion of the first portion 411 and an end portion of the second portion 412. In this case, the second terminal 420 (illustrated in FIG. 2) may be inserted between the first portion 411 and the second portion 412 through the opening 414. In this case, the first portion 411 and the second portion 412 may be spaced a separation distance D from each other in the first direction. In this case, the separation distance D may be a straight distance between the first surface 4112 and the second surface 4122 in the first direction. In this case, the separation distance D between the first portion and the second portion may be elastically changed by an external force. That is, a width of the opening 414 in the first direction may be elastically changed by the external force.

The first embossing 4111 and the second embossing 4121 may not overlap in the first direction and a second direction. In this case, a distance D1 between the first embossing 4111 and the second surface 4122 may be smaller than the separation distance D between the first surface 4112 and the second surface 4122. In addition, a distance D2 between the second embossing 4121 and the first surface 4112 may be smaller than the separation distance D between the first surface 4112 and the second surface 4122. In this case, the distance D1 between the first embossing 4111 and the second surface 4122 and the distance D2 between the second embossing 4121 and the first surface 4112 may be smaller than or equal to a thickness of the second terminal 420, which will be described below, in the first direction.

Widths W1 and W2 of the first embossing 4111 and the second embossing 4121 in the second direction may be greater than thicknesses T1 and T2 of the first embossing 4111 and the second embossing 4121 in the first direction, respectively. The width W1 of the first embossing 4111 in the second direction may be smaller than half of a length of the first portion 411 in the second direction. In addition, the width W2 of the second embossing 4121 in the second direction may be smaller than half of a length of the second portion 412 in the second direction. In addition, the thickness T1 of the first embossing 4111 in the first direction may be smaller than half of the separation distance D between the first surface 4112 and the second surface 4122. In addition, the thickness T2 of the second embossing 4121 in the first direction may be smaller than half of the separation distance D between the first surface 4112 and the second surface 4122.

The first embossing 4111 may include a first rounded portion 411R. The first rounded portion 411R may be disposed toward the opening 414. The first rounded portion 411R may be disposed at an edge of the first embossing 4111. The first rounded portion 411R may include a curved surface. In addition, the second embossing 4121 may include a second rounded portion 412R. The second rounded portion 412R may be disposed toward the opening 414. The second rounded portion 412R may be disposed at an edge of the second embossing 4121. The second rounded portion 412R may include a curved surface. In this case, the second rounded portion 412R may be disposed closer to the opening 414 than the first rounded portion 411R.

Figure 5:
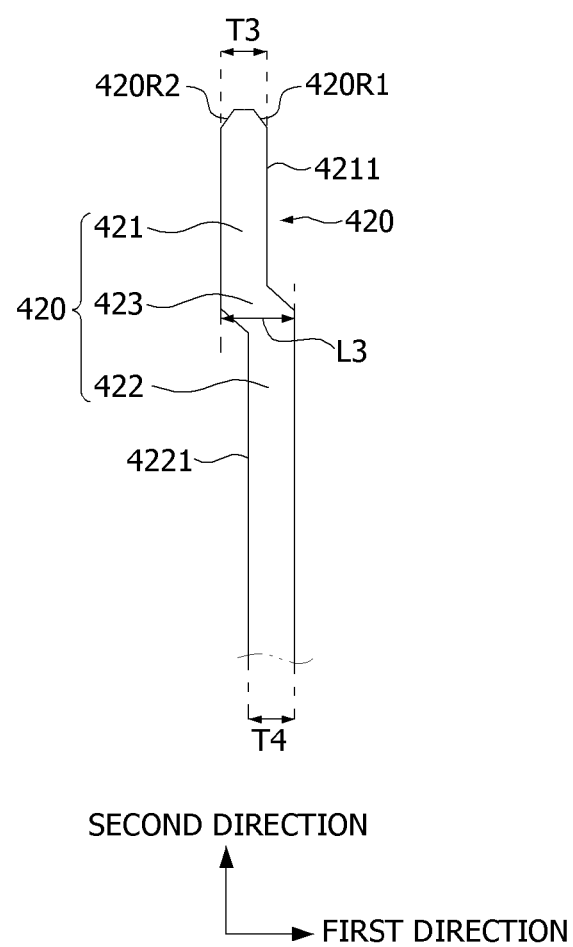
FIG. 5 is a view illustrating a part of a second terminal included in the motor according to one embodiment of the present invention.

FIG. 5 is a view illustrating a part of the second terminal included in the motor according to one embodiment of the present invention.

Referring to FIG. 5, the second terminal 420 may include a first part 421, a second part 422, and a third part 423.

The first part 421 may extend in the second direction. In addition, the first part 421 may include a first contact surface 4211 in contact with the first embossing 4111. In this case, a thickness T3 of the first part 421 in the first direction may be greater than or equal to the distance D1 between the first embossing 4111 and the second surface 4122 illustrated in FIG. 5.

The second part 422 may be disposed in the second direction with the first part 421. The second part 422 may be spaced apart from the first part 421. In addition, the second part 422 may include a second contact surface 4221 in contact with the second embossing 4121. The first contact surface 4211 and the second contact surface 4221 may be disposed to face different directions. The first contact surface 4211 and the second contact surface 4221 may not overlap in the second direction. A thickness T4 of the second part 422 in the first direction may be greater than or equal to the distance D2 between the second embossing 4121 and the first surface 4112 illustrated in FIG. 5. The thickness T4 of the second part 422 in the first direction may be the same as the thickness T3 of the first part 421 in the first direction.

The third part 423 may connect the first part 421 and the second part 422. The third part 423 may be obliquely disposed with respect to the second direction. A length L3 of the third part 423 in the first direction may be greater than the thickness T3 of the first part 421 or the thickness T4 of the second part 422 in the first direction.

The second terminal 420 may include a first region 420R1 and a second region 420R2. The first region 420R1 and the second region 420R2 may be disposed at an end portion of the first part 421. In this case, the first region 420R1 may include a curved or inclined surface corresponding to the curved surface of the first rounded portion 411R illustrated in FIG. 5. In addition, the second region 420R2 may include a curved or inclined surface corresponding to the curved surface of the second rounded portion 412R. In this case, the first region 420R1 may slide along the curved surface of the first rounded portion 411R while the second terminal 420 is inserted between the first portion 411 and the second portion 412. In addition, the second region 420R2 may slide along the curved surface of the second rounded portion 412R. Accordingly, the end portion of the second terminal 420 may be inhibited from being caught by the first embossing 4111 and the second embossing 4121.

Figure 6:
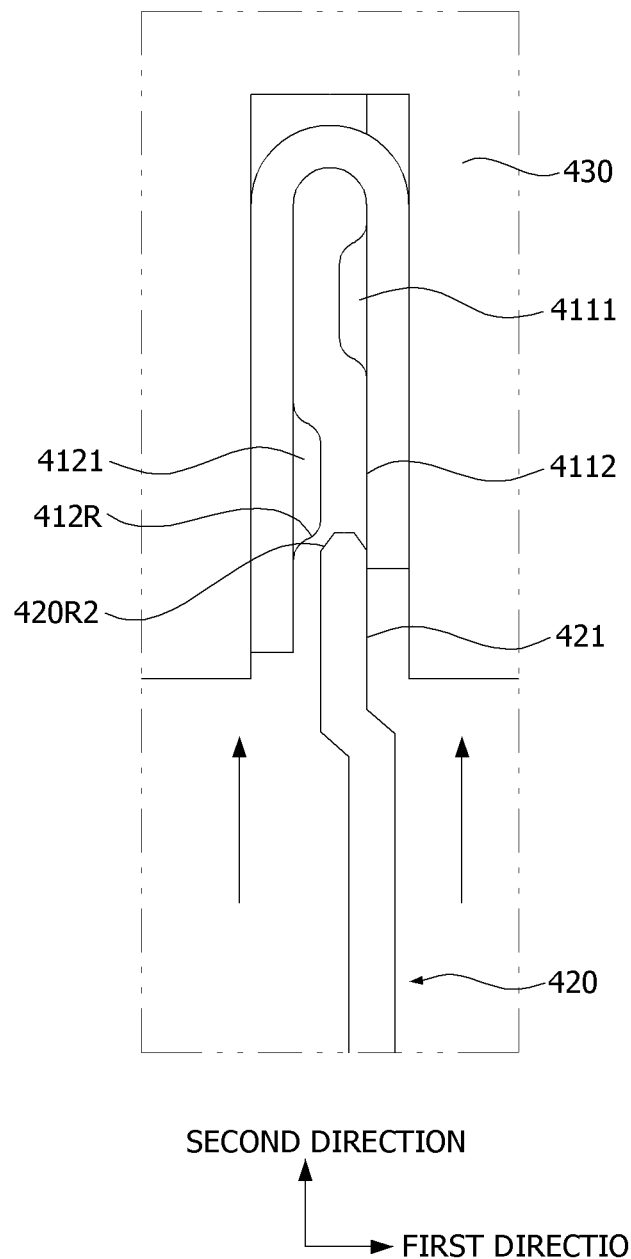
FIGS. 6 to 8 are views illustrating a state in which the second terminal is inserted between a first portion and a second portion included in the motor according to one embodiment of the present invention.
Figure 7:
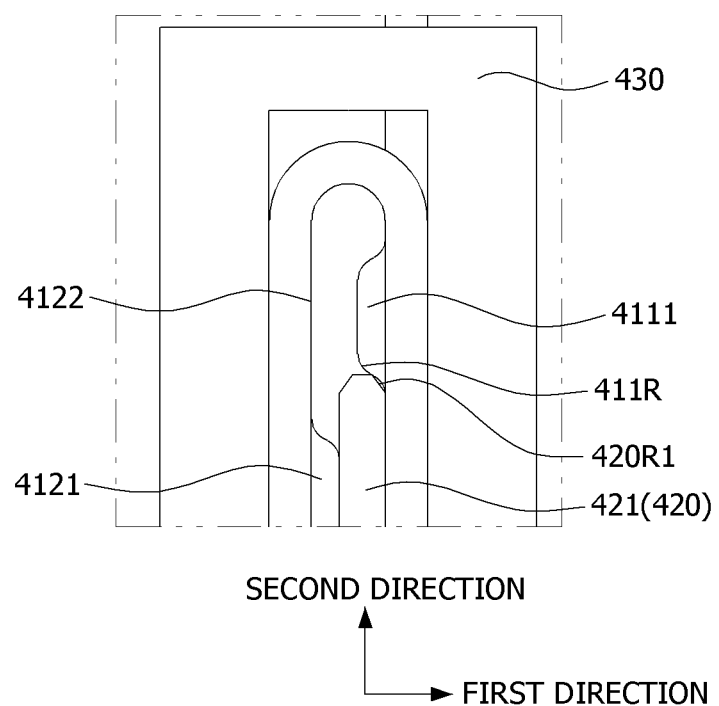
Figure 8:
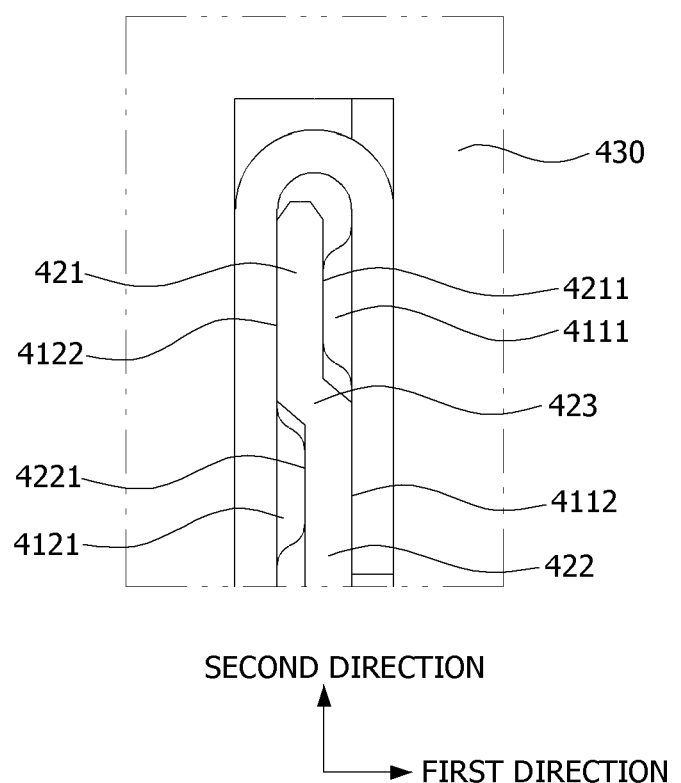

FIGS. 6 to 8 are views illustrating a state in which the second terminal is inserted between the first portion and the second portion included in the motor according to one embodiment of the present invention.

Referring to FIG. 6, the second terminal 420 may be inserted between the first portion 411 and the second portion 412 through the opening 414. The second terminal 420 may move in the second direction. The end portion of the second terminal 420 may pass through the opening 414 and come into contact with the second embossing 4121. In this case, the end portion of the second terminal 420 may come into contact with the second embossing 4121 earlier than with the first embossing 4111. The second region 420R2 of the second terminal 420 may be in contact with the second rounded portion 412R. In this case, the first region 420R2 may move along the curved surface of the second rounded portion 412R and slide between the second embossing 4121 and the first surface 4112.

Referring to FIG. 7, the end portion of the second terminal 420 may pass between the second embossing 4121 and the first surface 4112 and come into contact the first embossing 4111. The first region 420R1 of the second terminal 420 may come into contact with the first rounded portion 411R. In this case, the first region 420R1 may move along the curved surface of the first rounded portion 411R and slide between the first embossing 4111 and the second surface 4122.

Referring to FIG. 8, in a state in which the first terminal 410 and the second terminal 420 are coupled, the first contact surface 4211 of the first part 421 may be in contact with the first embossing 4111. In addition, an opposite surface of the first contact surface 4211 of the first part 421 may be in contact with the second surface 4122. Accordingly, movement of the first part 421 in the first direction may be fixed by the first embossing 4111 and the second surface 4122. In addition, the second contact surface 4221 of the second part 422 may be in contact with the second embossing 4121. In addition, an opposite surface of the second contact surface 4221 may be in contact with the first surface 4112. Accordingly, movement of the second part 422 in the first direction may be fixed by the second embossing 4121 and the first surface 4112. The third part 423 may be disposed between the first embossing 4111 and the second embossing 4121. The third part 423 may be obliquely disposed with respect to the second direction. The third part 423 may include an inclined surface facing the first embossing 4111. The third part 423 may include an inclined surface facing the second embossing 4121. Movement of the third part 423 in the second direction may be restricted by the first embossing 4111 and the second embossing 4121.

As described above, since the second terminal 420 is fixed with respect to the first and second directions using the first embossing 4111 and the second embossing 4121, the first terminal 410 and the second terminal 420 can be coupled even without performing a fusing process, and thus effects of simplifying a manufacturing process and reducing manufacturing costs can be obtained.

In the above embodiments, an example of an inner rotor type motor has been described, but the present invention is not limited thereto. The present invention can also be applied to an outer rotor type motor. In addition, the present invention can be used in various devices such as vehicles or home appliances. which are incorporated herein by reference in their entirety.

The invention claimed is:

1. A motor comprising:
a shaft;
a rotor coupled to the shaft; and
a stator disposed to correspond to the rotor,
wherein the stator includes a stator core, an insulator coupled to the stator core, and a coil disposed on the insulator,
the motor includes a busbar electrically connected to the coil and a busbar holder which that supports the busbar,
the busbar includes a first terminal and a second terminal connected to the first terminal,
the first terminal includes a first embossing and a second embossing, and
the second terminal includes a first part in contact with the first embossing and a second part in contact with the second embossing,
wherein the first part and the first embossing are disposed in a first direction, the second part and the second embossing are disposed in the first direction; and the first part and the second part are disposed in a second direction perpendicular to the first direction.

2. The motor of claim 1, wherein:
the first embossing and the second embossing are not overlapping in the first direction and a second direction.

3. The motor of claim 2, wherein:
the first terminal incudes a first portion and a second portion spaced apart from the first portion in the first direction; and
the first terminal includes an opening disposed between one end portion of the first portion and one end portion of the second portion.

4. The motor of claim 3, wherein at least one of the first embossing and the second embossing includes a rounded portion disposed to face the opening.

5. The motor of claim 4, wherein the second terminal includes a rounded portion disposed at an end portion thereof.

6. The motor of claim 3, wherein a separation distance between the first portion and the second portion in the first direction is elastically changed.

7. The motor of claim 3, wherein:
the first embossing is disposed on the first portion; and
the second embossing is disposed on the second portion.

8. The motor of claim 7, wherein:
the first portion includes a first surface spaced apart from the second embossing in the first direction; and
the second part is in contact with the second embossing and the first surface.

9. The motor of claim 7, wherein:
the second portion includes a second surface spaced apart from the first embossing in the first direction; and
the first part is in contact with the first embossing and the second surface.

10. The motor of claim 1, wherein:
the second terminal includes a third part that connects the first part and the second part; and
the third part is obliquely disposed with respect to the first part and the second part.

* * * * *